(12) United States Patent
Wang et al.

(10) Patent No.: US 10,196,288 B2
(45) Date of Patent: Feb. 5, 2019

(54) DEVICE FOR PURIFYING CROPLAND EFFLUENTS

(71) Applicant: HOHAI UNIVERSITY, Nanjing (CN)

(72) Inventors: Peifang Wang, Nanjing (CN); Chao Wang, Nanjing (CN); Jin Qian, Nanjing (CN); Jun Hou, Nanjing (CN); Lei Rao, Nanjing (CN); Ziyun Bao, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 243 days.

(21) Appl. No.: 15/358,107

(22) Filed: Nov. 21, 2016

(65) Prior Publication Data
US 2017/0121194 A1 May 4, 2017

Related U.S. Application Data

(63) Continuation-in-part of application No. PCT/CN2015/075487, filed on Mar. 31, 2015.

(30) Foreign Application Priority Data

May 21, 2014 (CN) .......................... 2014 1 0215464

(51) Int. Cl.
| | |
|---|---|
| C02F 3/10 | (2006.01) |
| E02B 11/00 | (2006.01) |
| C02F 1/28 | (2006.01) |
| B01D 39/20 | (2006.01) |
| C02F 1/00 | (2006.01) |
| C02F 1/74 | (2006.01) |
| C02F 101/10 | (2006.01) |
| C02F 101/16 | (2006.01) |

(Continued)

(52) U.S. Cl.
CPC .......... *C02F 3/101* (2013.01); *B01D 39/2068* (2013.01); *C02F 1/004* (2013.01); *C02F 1/285* (2013.01); *C02F 1/74* (2013.01); *E02B 11/00* (2013.01); *C02F 2101/105* (2013.01); *C02F 2101/16* (2013.01); *C02F 2101/306* (2013.01); *C02F 2103/06* (2013.01); *C02F 2201/002* (2013.01); *C02F 2209/42* (2013.01); *C02F 2303/14* (2013.01); *C02F 2303/24* (2013.01)

(58) Field of Classification Search
CPC .. C02F 3/101; C02F 1/004; C02F 1/74; C02F 1/285; B01D 39/2068; E02B 11/00
See application file for complete search history.

(56) References Cited

U.S. PATENT DOCUMENTS

2006/0163131 A1* 7/2006 Kieselbach .......... A01K 63/045
210/167.22

* cited by examiner

*Primary Examiner* — Chester T Barry
(74) *Attorney, Agent, or Firm* — Matthias Scholl P.C.; Matthias Scholl

(57) ABSTRACT

A device for purifying first-stage drainage effluents from dry croplands, the device including: a) a plastic corrugated pipe including an upright segment and a horizontal segment, the upright segment comprising plastic mesh openings; b) a steel wire mesh box filled with stuffing pellets including biological carriers; and an inspection cover. The plastic mesh openings are disposed at one end of the upright segment, the other end of the upright segment is connected to one end of the horizontal segment, and the other end of the horizontal segment is connected to the steel wire mesh box. The upper surface of the upright segment of the plastic corrugated pipe is lower than the upper surface of the field ditch, and the lower edge of the plastic mesh openings is higher than the bottom surface of the field ditch.

4 Claims, 4 Drawing Sheets

(51) Int. Cl.
*C02F 101/30* (2006.01)
*C02F 103/06* (2006.01)

DEVICE FOR PURIFYING CROPLAND EFFLUENTS

CROSS-REFERENCE TO RELATED APPLICATIONS

This application is a continuation-in-part of International Patent Application No. PCT/CN2015/075487 with an international filing date of Mar. 31, 2015, designating the United States, now pending, and further claims foreign priority benefits to Chinese Patent Application No. 201410215464.4 filed May 21, 2014. The contents of all of the aforementioned applications, including any intervening amendments thereto, are incorporated herein by reference. Inquiries from the public to applicants or assignees concerning this document or the related applications should be directed to:

BACKGROUND OF THE INVENTION

Field of the Invention

The invention relates to a device for purifying first-stage drainage effluents from dry croplands.

Description of the Related Art

Drainage ditches are widely used in dry croplands. However, conventional drainage ditches leave much to be desired. First, the ditches poorly control the groundwater level of the fields; and second, the drainage water contains high concentration of pollutants such as silt, nitrogen, phosphorus, pesticide and organic compounds, which tend to accumulate in the ditches.

SUMMARY OF THE INVENTION

In view of the above-described problems, it is one objective of the invention to provide a device for purifying first-stage drainage effluents from dry croplands.

The device of the present disclosure aims at solving the pollution of first-stage drainage effluents from dry croplands, and aims at adjusting the groundwater level and controlling nitrogen and phosphorus concentrations of the drainage water of fields to lower the eutrophication in dry croplands.

To achieve the above objective, in accordance with one embodiment of the invention, there is provided a device for purifying first-stage drainage effluents from dry croplands, the device comprising: a plastic corrugated pipe comprising an upright segment and a horizontal segment, the upright segment comprising plastic mesh openings; a steel wire mesh box filled with stuffing pellets comprising biological carriers; and an inspection cover.

The upright segment is connected to a tail end of a field ditch; the plastic mesh openings are disposed at one end of the upright segment, the other end of the upright segment is connected to one end of the horizontal segment, and the other end of the horizontal segment is connected to the steel wire mesh box; the upright segment and the horizontal segment form an included angle of 95 degrees; an upper surface of the upright segment of the plastic corrugated pipe is lower than an upper surface of the field ditch, and a lower edge of the plastic mesh openings is higher than the bottom surface of the field ditch; the horizontal segment communicates with an external ditch via the steel wire mesh box; the steel wire mesh box is surrounded by gravel; and the inspection cover is disposed at one end of the upright segment in the vicinity of the plastic mesh openings.

Advantages of the device for purifying first-stage drainage effluents from dry croplands of embodiments of the invention are summarized as follows:

(1) The water purification effect of the device is good. The plastic mesh of the purification device blocks large pollutants. The gravel filters the water flowing out of and in the steel wire mesh box. The vertical pipe has the aeration effect so that the falling drainage water increases the dissolved oxygen concentration which is conducive to growth and degradation of microorganisms. The stuffing pellets reduce the content of nitrogen, phosphorus and organic pollutants in the drainage water of the fields.

(2) The device can effectively adjust the groundwater level of fields and take full advantage of original field ridges, field ditches and outer ditches, thus saving a large amount of planting area.

(3) The inspection cover can be opened regularly to examine and repair blocked pipes without affecting the water drainage. The water purification device used during the first-stage drainage effluents from dry croplands forms an ecological drainage model, involves little infrastructure and does not change the agricultural production pattern.

(4) The construction and maintenance costs of the device are low. Operation management and maintenance are simple It is easy to popularize the device for purifying first-stage drainage effluents from dry croplands.

Figure 1:
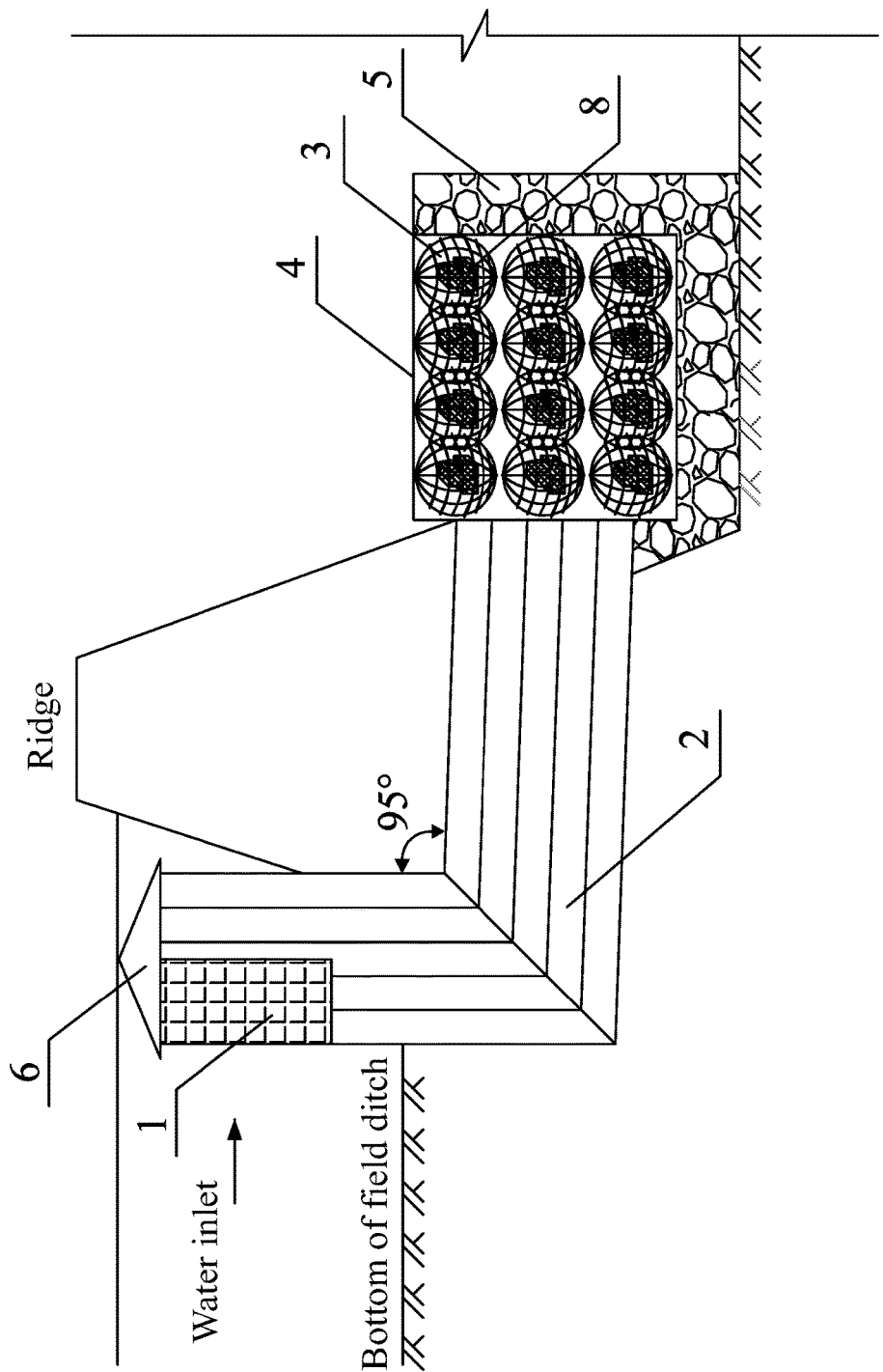
FIG. 1 is a section view of a device for purifying first-stage drainage effluents from dry croplands according to one embodiment of the invention.

In the drawings, the following reference numbers are used: 1. Plastic mesh opening; 2. Plastic corrugated pipe; 3. Stuffing pellets; 4. Steel wire mesh box; 5. Gravel; 6. Inspection cover; 7. Spherical raised framework; and 8. Biological carriers.

DETAILED DESCRIPTION OF THE EMBODIMENTS

For further illustrating the invention, experiments detailing a device for purifying first-stage drainage effluents from dry croplands are described below. It should be noted that the following examples are intended to describe and not to limit the invention.

As shown in FIG. 1, a plastic corrugated pipe 2 with plastic mesh openings 1 is vertically arranged at an end of a field ditch as a water guide pipe. The diameter of the plastic corrugated pipe is 20 cm or 30 cm or 40 cm. The plastic corrugated pipe turns 95° after extending downward by 20 cm from the bottom of the ditch and runs through the ridge slantwise at a 5° angle into the outer ditch so that water flows by itself without causing silt and the drainage water is aerated when falling down in the vertical pipe section. The plastic mesh openings 1 are arranged in the upper part of the vertical plastic corrugated pipe and are a semicircular curved surface. The plastic mesh openings are a 1 cm×1 cm rectangle. The bottom of the plastic mesh openings is 15 cm higher than the bottom of the field ditch so as to adjust the water level. When the groundwater level is too high, the water level of the field ditch goes up. The first-stage drainage water of cropland enters the device for improving water purification through the plastic mesh openings and then is discharged. The plastic mesh works as a grid to intercept large impurities. The bottom of the plastic mesh openings 1 is 15 cm higher than the bottom of the field ditch. The plastic corrugated pipe 2 is 30 cm in diameter. The top of the plastic corrugated pipe is 5 cm lower than the top of the ditch. The plastic corrugated pipe turns 95° after extending downward by 20 cm from the bottom surface of the ditch, communicates with the outer ditch through the ridge, and is connected to the steel wire mesh box 4 filled with the stuffing pellets 3 and the biological carriers 8. The steel wire mesh box 4 can be opened. The dimension size of the steel wire mesh box is 50 cm×40 cm×40 cm. The side where the bottom of the steel wire mesh and the steel wire mesh 4 communicate with the plastic pipe adjoins to the wall of the outer ditch. Besides the side of the plastic corrugated pipe 2, the other three sides are enclosed and protected by gravel 5 of proper sizes to ensure the stability of the plastic mesh box. The gravel filters the water flowing out of and in the steel wire mesh box and prevents the steel wire mesh box from moving by water. The inspection cover 6 is arranged at the upper opening of the vertical corrugated pipe and is a conical cover to reduce the pressure received by the plastic pipe. The bottom diameter of the inspection cover is larger than that of the plastic corrugated pipe. The height of the inspection cover is 5 cm. The inspection cover is used for regular inspection to guarantee smooth drainage.

Figure 2:
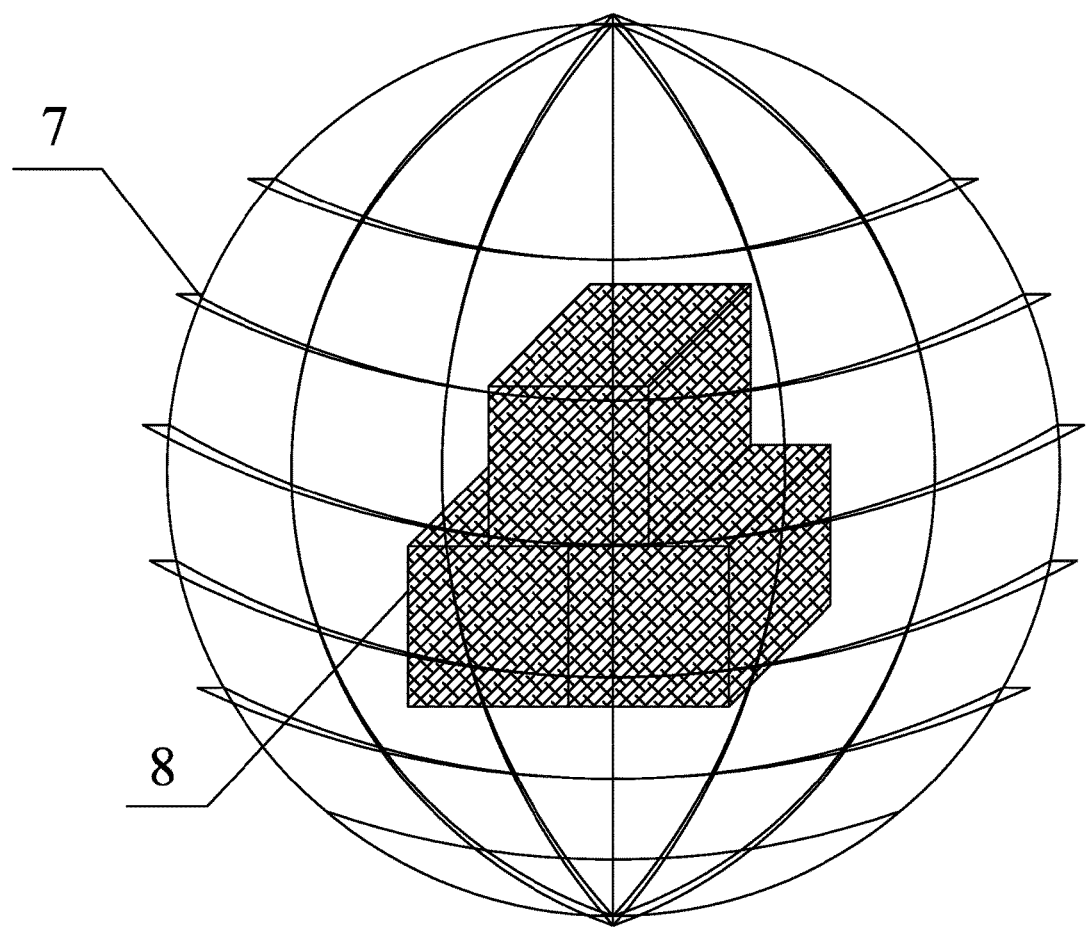
FIG. 2 is a schematic diagram of a stuffing pellets of a device for purifying first-stage drainage effluents from dry croplands according to one embodiment of the invention.

As shown in FIG. 2, the stuffing pellets 3 comprises a polyolefin framework made out of polyolefin plastic and biological carriers comprising polyurethane with a large specific surface area and is used to remove nitrogen, phosphorus and biodegradable organic compounds. The diameter of the stuffing pellets is 6 cm.

Figure 3:
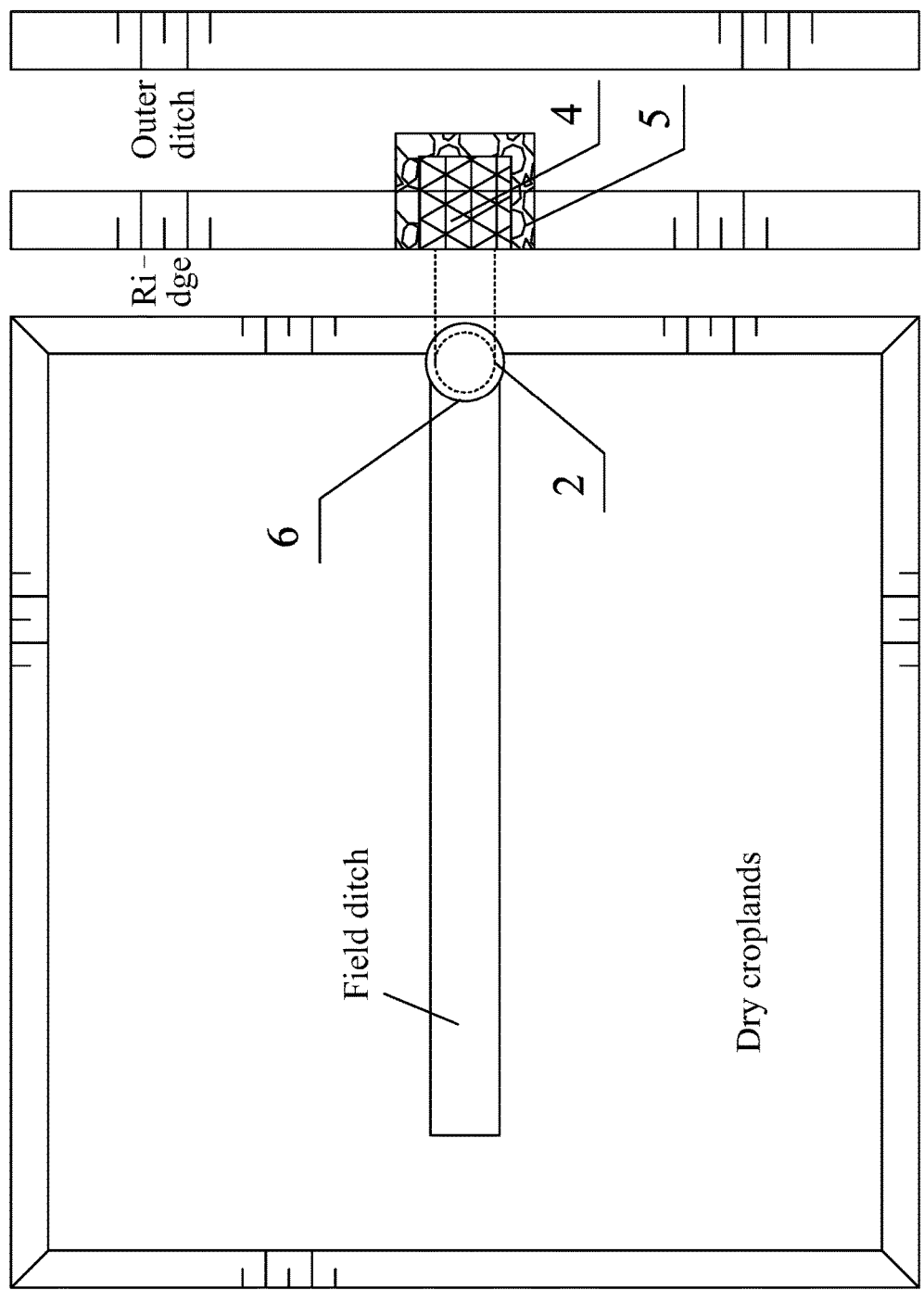
FIG. 3 is a plane figure of a device for purifying first-stage drainage effluents from dry croplands according to one embodiment of the invention.

As shown in FIG. 3, a field ditch is arranged in dry croplands. The end of the field ditch leads to a ridge adjoining to the outer ditch. The cross section of the ridge adjoining to the outer ditch as shown in FIG. 1 is trapezoidal. The surface where the steel wire mesh box 4 is communicated with the plastic corrugated pipe 2 adjoins to the outer wall of the trapezoidal ridge. The other three sides and the bottom of the steel wire mesh box are enclosed and protected by gravel wall. The device for improving water purification has a reasonable structural design, takes full advantage of original field ridges, field ditches and outer ditches, and works as an ecological outlet. In this embodiment, the bottom of the outer ditch is no less than 40 cm lower than the bottom of the field ditch.

Figure 4:
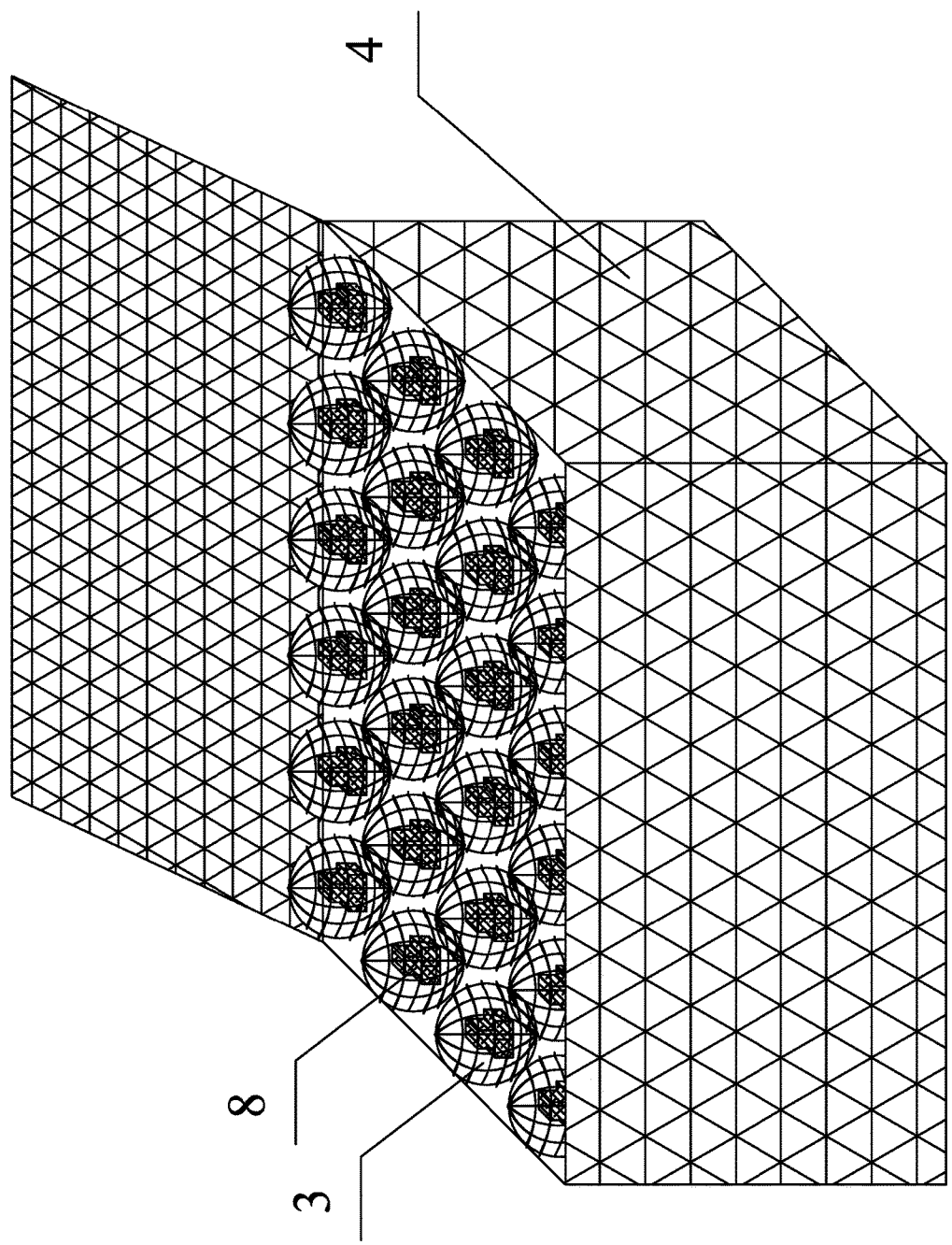
FIG. 4 is a schematic diagram of a steel wire mesh box of a device for purifying first-stage drainage effluents from dry croplands according to one embodiment of the invention.

As shown in FIG. 4, the steel wire mesh box 4 can be opened for easy replacement of stuffing pellets. The size of the steel wire mesh box is determined according to the diameter of the plastic pipe and the width of the outer ditch and can be designed as 50 cm×40 cm×40 cm or 60 cm×50 cm×50 cm. The hole diameter of the steel wire mesh is less than the diameter of the stuffing pellets. The steel wire mesh box 4 is filled with the stuffing pellets 3 and the biological carriers 8.

In the embodiment, when the groundwater level is too high or the surface water is too much, the water level of the field ditch rises and the drainage water enters the device for improving water purification through the plastic mesh openings and then is discharged in time. At the same time, larger impurities in the drainage water are intercepted by the plastic mesh openings. The drainage water is aerated by falling down in the vertical pipe section to increase dissolved oxygen and then goes through the biological carriers to effectively reduce nitrogen, phosphorus and organic pollutants to purify water. When the groundwater level doesn't reach a certain height and the water level of the field ditch is lower than the plastic mesh openings, the water is not discharged. When the biological membranes on the biological purification pellets become ageing after the purification device has run for a period of time, it is easy to open the steel wire mesh box to treat and replace biological purification pellets. The arranged inspection cover can be opened regularly to examine and repair blocked pipes to guarantee smooth drainage.

EXAMPLE 1

The device for purifying first-stage drainage effluents from dry croplands comprises a plastic mesh, a plastic corrugated pipe, stuffing pellets, a steel wire mesh box, gravel and an inspection cover. The plastic corrugated pipe with plastic mesh openings is vertically arranged at an end of a field ditch. The top end of the plastic corrugated pipe is slightly lower than the top of the ditch. The plastic corrugated pipe turns 95° at a proper position below the bottom, runs through the ridge into the outer ditch, and is connected with a steel wire mesh box filled with stuffing pellets and biological carriers. Gravel is piled up around the steel wire mesh box to prevent the impact of water flows and filter water. The inspection cover is arranged at the upper opening of the vertically arranged plastic corrugated pipe with plastic mesh openings for inspection so as to guarantee smooth drainage of the pipe. The plastic mesh openings are arranged in the upper part of the vertical plastic corrugated pipe and are a semicircular curved surface. The bottom of the plastic mesh openings is appropriately higher than the bottom of the field ditch to adjust the water level. When the groundwater level is too high or the surface water is too much, the water level of the field ditch rises and the drainage water enters the device for improving water purification through the plastic mesh openings and then is discharged in time. At the same time, larger impurities in the drainage water are intercepted by the plastic mesh openings. Nitrogen, phosphorous and organic pollutants in the drainage water can be effectively reduced after the drainage water goes through the stuffing pellets. When the groundwater level does not t reach a certain height and the water level of the field ditch is lower than the plastic mesh openings, the water is not discharged. When the biological membranes on the biological purification pellets become ageing after the purification device has run for a period of time, it is easy to open the steel wire mesh box to treat and replace biological purification pellets.

The invention claimed is:
1. A device for purifying effluents from dry croplands, the device comprising:
  a) a plastic corrugated pipe comprising an upright segment and a horizontal segment, the upright segment comprising plastic mesh openings;
  b) a steel wire mesh box filled with stuffing pellets comprising biological carriers; and
  c) an inspection cover;
wherein
  the upright segment is connected to a tail end of a field ditch;

the plastic mesh openings are disposed at one end of the upright segment, the other end of the upright segment is connected to one end of the horizontal segment, and the other end of the horizontal segment is connected to the steel wire mesh box;

the upright segment and the horizontal segment form an included angle of 95 degrees;

an upper surface of the upright segment of the plastic corrugated pipe is lower than an upper surface of the field ditch, and a lower edge of the plastic mesh openings is higher than the bottom surface of the field ditch;

the horizontal segment communicates with an external ditch via the steel wire mesh box;

the steel wire mesh box is surrounded by gravel; and the inspection cover is disposed at one end of the upright segment in the vicinity of the plastic mesh openings.

2. The device of claim 1, wherein the plastic corrugated pipe has a diameter of 20 cm, 30 cm, or 40 cm; a joint of the upright segment and the horizontal segment of the plastic corrugated pipe is 20 cm lower than the bottom surface of the field ditch; and the horizontal segment of the plastic corrugated pipe is inclined downwards by 5 degrees and communicates with the external ditch.

3. The device of claim 1, wherein the plastic mesh openings are arranged in an upper part of the upright segment of the plastic corrugated pipe and each is a 1 cm×1 cm rectangle; the lower edge of the plastic mesh openings is 15 cm higher than the bottom surface of the field ditch; the plastic corrugated pipe is 30 cm in diameter; the upper surface of the upright segment of the plastic corrugated pipe is 5 cm lower than the upper surface of the field ditch; the steel wire mesh box is openable, and has a dimension size of 50 cm×40 cm×40 cm or 60 cm×50 cm×50 cm; the inspection cover is conical, and a bottom diameter of the inspection cover is larger than the diameter of the plastic corrugated pipe.

4. The device of claim 1, wherein the stuffing pellets comprise a polyolefin framework made of polyolefin plastic and biological carriers comprising polyurethane, and have a diameter of 6 cm.

* * * * *